(12) United States Patent  
Alić et al.

(10) Patent No.: US 8,155,530 B2  
(45) Date of Patent: Apr. 10, 2012

(54) SYSTEM AND METHOD FOR INCREASING SPECTRAL EFFICIENCY, CAPACITY AND/OR DISPERSION-LIMITED REACH OF MODULATED SIGNALS IN COMMUNICATION LINKS

(75) Inventors: Nikola Alić, La Jolla, CA (US); Stojan Radic, Solana Beach, CA (US); George Papen, San Diego, CA (US); Yeshaiahu Fainman, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 611 days.

(21) Appl. No.: 11/911,109

(22) PCT Filed: Apr. 25, 2006

(86) PCT No.: PCT/US2006/015936  
§ 371 (c)(1),  
(2), (4) Date: Oct. 9, 2007

(87) PCT Pub. No.: WO2006/116554  
PCT Pub. Date: Nov. 2, 2006

(65) Prior Publication Data  
US 2008/0226301 A1     Sep. 18, 2008

Related U.S. Application Data

(60) Provisional application No. 60/674,571, filed on Apr. 25, 2005.

(51) Int. Cl.  
*H04B 10/12* (2006.01)

(52) U.S. Cl. .................. 398/147; 398/159; 398/158

(58) Field of Classification Search .................. 398/182, 398/183, 186, 187, 118, 140, 141, 158, 159, 398/147, 149, 192; 359/337.5, 308  
See application file for complete search history.

(56) References Cited

U.S. PATENT DOCUMENTS 3,412,214 A * 11/1968 Gabor ........................... 360/22  
(Continued)

FOREIGN PATENT DOCUMENTS

JP     63-313925     * 12/1988

OTHER PUBLICATIONS

Alic, et al., "Experimental Demonstration of 10/Gb/s NRZ Extended Dispersion-Limited Reach over 600km-SMF Link w/o Optical Dispersion Compensation", Mar. 5-10, 2006, Tech. Abstr. 2006 Optical Fiber Comm./Nat'l Fiber Optic Eng. Conf (OFC/NFOEC).  
Kahn, "Spectral Efficiency Limits & Modulation/Detection Techniques for DWDM Systems", IEEE J. Sel. Topics in Quantum Electronics, Mar./Apr. 2004, vol. 10, No. 2: 259-272.

(Continued)

*Primary Examiner* — M. R. Sedighian  
(74) *Attorney, Agent, or Firm* — Eleanor M. Musick; Procopio, Cory, Hargreaves & Savitch LLP

(57) ABSTRACT

A system and method for increasing spectral efficiency, capacity and/or extending dispersion-limited reach in a communication link employs narrow filtering of a baseband signal to reduce the original bandwidth to a substantially smaller bandwidth for transmission across a transmission medium such as an optical fiber. By restricting the bandwidth, the rate of spreading is reduced significantly. The receiver at the other end of the transmission medium includes an equalizer for returning the received signal to its original bandwidth for retrieval of information contained in the signal.

27 Claims, 6 Drawing Sheets

U.S. PATENT DOCUMENTS

| | | | | |
|---|---|---|---|---|
| 5,267,072 | A * | 11/1993 | Maleki | 398/158 |
| 5,384,651 | A | 1/1995 | Van de Voorde et al. | |
| 5,793,880 | A * | 8/1998 | Constant | 382/100 |
| 6,473,214 | B1 * | 10/2002 | Roberts et al. | 398/183 |
| 7,409,163 | B2 * | 8/2008 | Gill et al. | 398/159 |
| 2002/0114408 | A1 * | 8/2002 | Hamalainen | 375/329 |
| 2003/0175036 | A1 * | 9/2003 | Mamyshev et al. | 398/188 |
| 2004/0126114 | A1 * | 7/2004 | Liu et al. | 398/81 |
| 2005/0105916 | A1 * | 5/2005 | Lee et al. | 398/182 |
| 2005/0105919 | A1 * | 5/2005 | Sugihara et al. | 398/202 |
| 2006/0098699 | A1 * | 5/2006 | Sanchez | 372/26 |

OTHER PUBLICATIONS

Killey, et al., "Electronic Dispersion Compensation by Signal Predistortion Using Digital Processing & a Dual-Drive Mach-Zehnder Modulator", IEEE Photonics Tech. Ltrs, Mar. 2005, vol. 17, No. 3: 714-16.

Kramer, et al., "Spectral Efficiency of Coded Phase-Shift Keying for Fiber-Optic Communication", J. Lightwave Tech., Oct. 2003, vol. 21, No. 10: 2438-2445.

Xu, et al., "Differential Phase-Shift Keying for High Spectral Efficiency Optical Transmissions", IEEE J. Sel. Topics in Quantum Electronics, Mar./Apr. 2004, vol. 10, No. 2: 281-293.

* cited by examiner

SYSTEM AND METHOD FOR INCREASING SPECTRAL EFFICIENCY, CAPACITY AND/OR DISPERSION-LIMITED REACH OF MODULATED SIGNALS IN COMMUNICATION LINKS

RELATED APPLICATIONS

The present application claims the priority of U.S. provisional application No. 60/674,571, filed on Apr. 25, 2005, which is incorporated herein by reference in its entirety.

BACKGROUND OF THE INVENTION

1. Field of the Invention

The present invention relates generally to the field of communications systems and more particularly to a device and method for increasing spectral efficiency, capacity and/or dispersion-limited reach in a communications system.

2. Related Art

Fiber optic technology has been widely adopted for use in communication systems due to its superiority over conventional copper cable in terms of speed, bandwidth capacity, signal quality, insensitivity to electromagnetic interference and data security, among other advantages. Since the first systems were deployed in the 1980s, per channel capacity has continuously increased from 155 Mb/s up to the current standard of 10 Gb/sec and further up to the newest systems with capacities of 40 Gb/sec. Although optical communication is among the fastest high-capacity data transport means currently available, there remain a number of factors that limit the fiber capacity. Some of these limitations are attributable to the point-to-point links connecting electrical switches or routers and the active devices that transmit and receive light at the ends of the fiber. Another factor is simple attenuation of the transmitted signal. In addition, various dispersion phenomena affect the ability to recover the signal.

Dispersion in uncompensated fiber optic links causes pulse broadening and intersymbol interference ("ISI"). In ISI, some of the energy transmitted for one bit overlaps at the receiver with that for other, typically adjacent, bits. If the electrical signal within the receiver is represented using an eye diagram, the dispersion can be seen to lead to eye closure. The dispersion can be chromatic dispersion and/or polarization mode dispersion ("PMD"). The degradation due to dispersion increases with signal bandwidth. In long distance transmission systems, dispersion can also interact with non-linearity in the optical fiber to further impair transmission.

In a typical optical transmission system, the optical carrier, generated by a laser source, is intensity-modulated with the data signal. Then, the signal is modulated using a directly on-off keyed ("OOK") signal representing binary digits. The most commonly used data modulation format in optical systems has been a non-return to zero on-off keying ("NRZ-OOK").

In an NRZ-OOK format, a binary 'one' is represented by light being 'on' and a binary 'zero' by light being 'off.' This format generally exhibits good spectral efficiency in multi-wavelength systems, reasonable distance capability, and straightforward implementation. When longer transmission distances are required, such as in a submarine or in a long-haul terrestrial fiber-optic link, the NRZ-OOK format is often modified by returning the 'one' level to 'zero' within each bit period (RZ-OOK), and possibly by adding some amount of optical phase modulation to each bit. This modulation format increases the distance reach at the expense of more complicated components and reduced spectral efficiency.

The dispersion limited distance for NRZ format is approximately 80-100 km. One method for compensating for chromatic dispersion-induced ISI is within the optical domain, using relatively costly and bulky optical means. In 2001, electronic dispersion compensation ("EDC") was suggested for extraction of information from ISI corrupted optical links. EDC has been shown to be more flexible and less expensive than true optical dispersion compensation. Using transversal filters, portions of the electronic input signal are subjected to different time delays and recombined after amplification to suitable levels. If the settings are carefully optimized, EDC can significantly improve the signal quality, however, the full potential of true optical dispersion compensation cannot be reached. For a given transmitter and fiber, electronic dispersion compensation can increase the achieved transmission distances on the order of fifty percent.

The dispersion limited reach with EDC is ultimately limited by the amount of spreading of the optical waveforms. For example, it has been shown that EDC links operating at 10 Gb/s are limited to approximately 200 km. The limit is imposed by the increased complexity of the equalizer, which grows exponentially with the span of ISI.

A number of modulation formats have been introduced in efforts to extend dispersion limited reach and/or spectral efficiency, with or without EDC. Such advanced modulation formats include Duobinary Modulation, Single Sideband Modulation, Duobinary Single Sideband Modulation, Quadrature phase shift keying ("QPSK") or M-ary PSK, and Optical oQPSK. Other known methods include EDC performed on regular OOK systems (NRZ, RZ, CS-RZ, CRZ etc.), or on one of the above-described advanced modulation formats. Each of these approaches adds complexity and expense to the transmission system, and can also impact robustness, reliability and upgradeability. Accordingly, the need remains for a system and method that increases spectral efficiency, capacity and/or dispersion limited reach using inexpensive, flexible and robust means. The present invention is directed to such a need.

SUMMARY OF THE INVENTION

In an exemplary embodiment, a passive filter is located at the transmitter to narrowly filter the information spectrum prior to modulation. This filter is implemented jointly with a filter of the same complexity at the receiver end for limiting amplifier noise as well as crosstalk from neighboring channels. In an alternate embodiment, the filtering is performed after modulation.

In one aspect of the invention, the method for increasing spectral efficiency and dispersion limited reach of a signal in a communications system comprises narrowly filtering a baseband signal having a first bandwidth to reduce the baseband signal to a second bandwidth; before or after filtering, modulating the baseband signal; transmitting the filtered and modulated baseband signal across a transmission medium; receiving the transmitted signal at a receiver in communication with the transmission medium; converting the received signal into an electrical signal; and equalizing the electrical signal to expand it to the first bandwidth.

In one embodiment, spectral efficiency and dispersion-limited reach in a communications link are improved by reducing a bandwidth of the signal by filtering an electrical baseband signal having a first bandwidth with a linear filter having a second bandwidth much narrower than the first bandwidth, modulating the filtered signal having the second bandwidth for transmission across the communications link; receiving the filtered signal at a receiver and equalizing the received signal with an equalizer to retrieve data within the received signal. In a preferred embodiment, the narrowed signal is reduced below one-quarter of an input bit rate.

In another aspect of the invention, the system for increasing spectral efficiency and extending dispersion limited reach of a signal in a communications link comprises a narrow filter module configured for receiving an input baseband signal having a first bandwidth, reducing the first bandwidth of the input baseband signal to a narrowed output baseband signal having a second bandwidth much smaller than the first bandwidth; a modulator for modulating the narrowed signal; a transmission medium for transmitting the modulated narrowed signal; a receiver for receiving the modulated narrowed signal; and an equalizer for retrieving data from the received signal. In a preferred embodiment, the narrowed signal is reduced below one-quarter of an input bit rate, where the bit rate is expressed in terms of frequency.

According to the present invention, the rate of ISI span increase is reduced by excessively filtering the information spectrum before transmission, thus reducing the optical bandwidth. This produces severe ISI, thus requiring equalization at the receiving end to retrieve the transmitted information. However, due to the forced reduced spectral content, while the initial ISI is severe, it increases at a very slow rate, ultimately permitting substantially extended dispersion limited reach. The reduced spectral width can be exploited to increase spectral efficiency in areas of communication and/or in communication channels that do not experience dispersion, such as communication based on Radio Frequency ("RF"), Ultra Wide Band, and Optical Communications (both fiber based and free-space).

Filtering in the electrical domain is resilient to ambient fluctuations and is more cost effective than the equivalent method of filtering in the optical domain after modulation. In implementation, linearity of the filter is an important consideration. In cases of nonlinear response of the modulator or the modulation process, the filtering operation must be jointly performed with the modulation driver output voltage.

The present invention extends the dispersion limited reach in an optical fiber link to at least 500 km by relying on simple OOK signaling, without introducing additional complexity into the transmitter. In addition, the invention permits the deployment of higher spectral efficiency systems based on OOK signaling and can increase the spectral efficiency of the existing systems two- to five-fold. The limit of 500 km is imposed by the currently available technology, however experiments indicate that it can be increased with the advancement in the realizable integrated circuits.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION OF THE PREFERRED EMBODIMENTS

Figure 1:
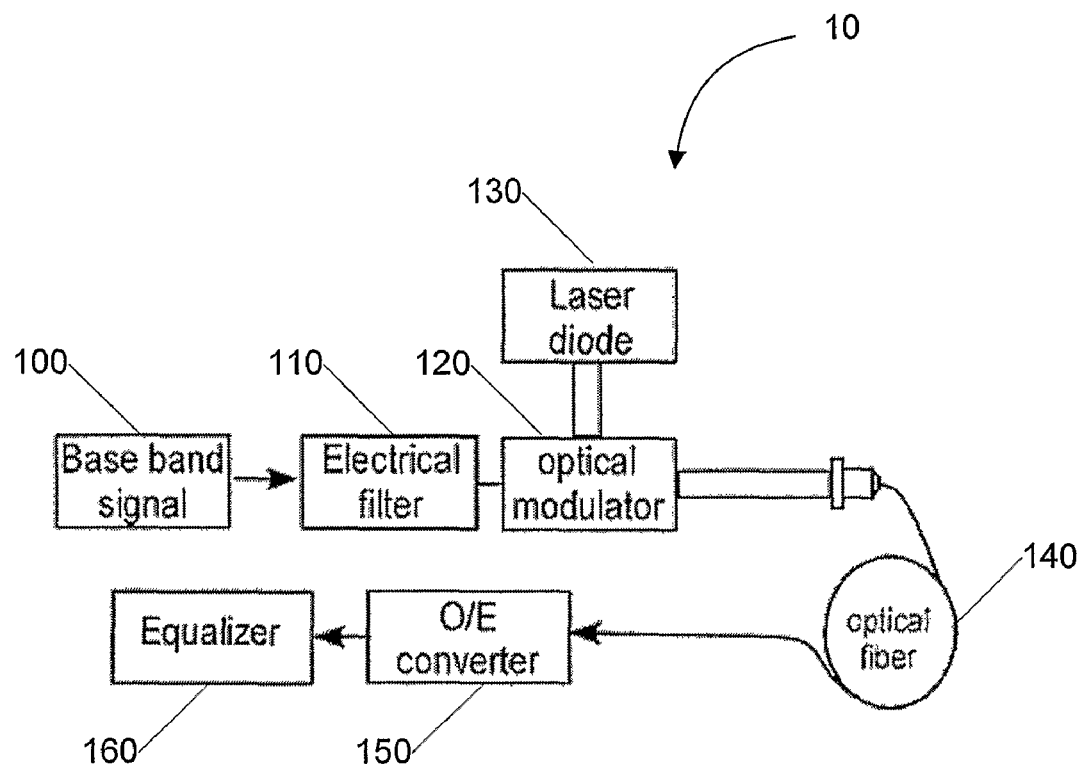
FIG. 1 is a schematic diagram of an optical system according to an embodiment of the present invention.

The following detailed description utilizes a number of acronyms which are generally well known in the art. While definitions are typically provided with the first instance of each acronym, for convenience, Table 1 below provides a list of the acronyms and abbreviations used herein along with their respective definitions.

TABLE 1

| ACRONYM | DEFINITION |
|---------|------------|
| BER | Bit error rate |
| DPSK | Differential phase shift keying |
| DSP | Digital signal processor |
| EDC | Electronic dispersion compensation |
| FDM | Frequency division multiplexing |
| FIR | Finite input response |
| ISI | Intersymbol interference |
| MLSE | Maximum likelihood sequence estimate equalizer |
| MUX | Multiplexer |
| NF-OOK | Narrowly filtered on-off keying |
| NRZ-OOK | Non-return to zero on-off keying |
| O/E | Optical to electrical signal converter |
| OOK | On-Off keying |
| OSA | Optical spectrum analyzer |
| OSNR | Optical signal to noise ratio |
| PMD | Polarization mode dispersion |
| PSK | Phase shift keying |
| QPSK | Quadrature phase shift keying |
| RF | Radio frequency |
| RZ-OOK | Return to zero on-off keying |
| SMF | Single mode fiber |
| TDM | Time division multiplexing |
| UWB | Ultra wide-band |
| VA | Viterbi algorithm |
| VOA | Variable optical attenuator |
| WDM | Wavelength division multiplexing |

The exemplary embodiments disclosed herein provide for a device and method for increasing spectral efficiency, capacity and/or dispersion-limited reach in a communication system. While the described exemplary embodiments are directed to an optical communication system, it will be readily apparent to those in the art that the present invention is also applicable to wireless communications and any other communications system in which information-bearing pulses are modulated onto a signal having a bandwidth that can be substantially restricted.

In an exemplary embodiment in an optical communication link, the method is based on the narrow filtering of a conventional NRZ transmitter, enabling a substantial extension in the dispersion-limited reach. The technique utilizes the Viterbi algorithm ("VA") and VA-based processing. For example, one method as disclosed herein allows for transmission over cumulative dispersion of 10200 ps/nm. In this method, the slow rate of increase of the ISI-span allows the use of low-complexity equalizers for the same amount of accumulated dispersion.

In the preferred embodiment, a substantial extension in the dispersion-limited reach is enabled using only passive filtering at the transmitter. The passive filtering must be implemented jointly with signal processing at the receiver of the same complexity that would normally be performed on unfiltered information at significantly shorter distances in fiber-optic based systems. Experimental validation of the presented method of up to 225 km was performed with Bit Error Rate below 5e-6. Performance evaluations were also performed at back-to-back (0 km), 100 km and 150 km. In the experimental validation configurations, the signal evolution matched excellently predictions of simulations.

Potential commercial applications of the present invention include extending dispersion-limited reach such as repeater/transponder spacing when used in conjunction with electronic equalization or EDC in fiber optic links. Also, the present method provides for an increase of the spectral efficiency in Frequency Division Multiplexing ("FDM") or Wavelength Division Multiplexing ("WDM") systems in optical, RF and Ultra Wide Band ("UWB") communication systems, as well as in communication systems that do not rely on exact carrier phase locking.

FIG. 1 is a schematic diagram of an optical system 10 according to an embodiment of the present invention. As illustrated, the optical system 10 comprises an electrical baseband signal 100, which is ported first to an electrical filter 110 and then to an optical modulator 120. The electrical baseband signal 100 is substantially narrowed by excessive filtering by the electrical filter 110 before modulation. For example, the electrical baseband signal 100 having 10 Gb/s tributary with equivalent bandwidth of 7.75 GHz is filtered by a 2 GHz electrical filter 110.

Since the linearity of the filter 110 is important to preserve linearity of the signal, filter 110 is preferably a linear filter. Filtering in the electrical domain has the advantage of being resilient to the ambient fluctuations. Alternatively, the filtering may be performed after modulation in the optical domain.

Signal filtering can be achieved in several ways. One method is by an explicit use of filters. Another method is to utilize components in the modulation process that have restricted bandwidth and/or impedance mismatch. Yet another method of performing the filtering is by exploiting imperfections of the cabling or other transmission medium. The common denominator for all of the applicable filtering methods is that the transmitted signal has a substantially narrower bandwidth than the original signal in baseband, or before the application of spread-spectrum techniques, for example, in RF communication.

While the preferred embodiment utilizes low pass filtering, other filtering techniques may also be employed. Alternative filtering techniques include, but are not limited to, bandpass filtering, active filtering, pre-coding and/or constraint coding, or any combination of the above that will produce similar spectral shaping. Narrow filtering can be extended to modulation techniques that are not intensity- or amplitude-based. Narrow filtering can also be used in non-binary signaling applications that are involved in other areas of communications and in data storage.

After narrowing of the bandwidth in electrical filter 110, the signal is passed to an optical modulator 120, which, in combination with a laser diode 130 or other appropriate light source, make up the optical transmitter. In the optical communications system of the exemplary embodiment, the modulator 120 implements binary modulation in the form of OOK for transmission over an optical fiber 140.

The extension of the dispersion-limited reach is achieved by relying on the simple OOK modulation system without introducing further complexity into the transmitter with the use of additional amplitude or phase modulators. The narrow electrical filter in combination with OOK modulation also allows deployment of higher spectral efficiency systems based on OOK signaling and can increase the spectral efficiency of existing systems two- to five-fold.

The present invention is able to reduce the rate of ISI span increase by intentionally excessively filtering the information spectrum before transmission. This produces severe ISI such that equalization is necessary at the receiving end to retrieve the transmitted information. While the initial ISI may be severe due to the forced reduced spectral content, it grows at a very slow rate, ultimately permitting substantially extended dispersion limited reach at least up to 500 km. Experimental testing demonstrated an extended reach of 600 km.

The optical fiber 140 delivers the light signal to an optical receiver, which is an Optical to Electric converter ("O/E") 150. The optical converter 150 is a detector that converts modulated light received from an optical fiber into an electrical signal. Such detectors are well known in the art. The converted signal is then processed by equalizer 160 to return the electrical signal to its original bandwidth for retrieval of the data contained in the signal.

A number of different electronic equalization techniques can be used for information retrieval. For example, the equalization may be performed using feed-forward equalizers, decision-feedback equalizers, any realization of the Viterbi algorithm, algorithms providing soft information output for the ISI channel (e.g., BCJR, SISO, MAP, sliding window MAP, Soft Output Viterbi Algorithm (SOVA)), or any reduced complexity variation of the above algorithms, etc. Soft information is of importance because the output of these algorithms can be passed directly to error-correction modules that are often used in conjunction with equalization. In addition, it is known in the art that soft information provides substantial improvements in the decoding process and directly enables usage of the iterative decoding such as Turbo codes and Low density parity check ("LDPC") codes. Even if the soft information is not used for soft decision decoding, the above soft output algorithms can be reduced to "hard decision" algorithms.

In an exemplary embodiment, equalizer 160 is a Maximum Likelihood Sequence Estimate ("MLSE") equalizer. It is well known in the art that MSLE is the optimal equalizer for minimizing the probability of sequence error for channels with intersymbol interference. MLSE has been widely utilized in several areas of communication over the past two decades, including performance and error analysis of MLSE for electronic dispersion compensation and MLSE for systems dominated by polarization mode dispersion.

In the exemplary embodiment, the MLSE equalizer 160 is applied to optical links containing a single optical pre-amplifier. The MLSE equalizer 160 uses the Viterbi algorithm to equalize a linearly modulated signal through a disperse channel. In order for MLSE to be applicable, the noise samples in different bit-slots need to be independent. The equalizer 160 receives a frame-based input signal and outputs the MLSE of the signal, using an estimate of the channel modeled as a finite input response ("FIR") filter.

The narrowly filtered link 10 for extending reach and spectral efficiency can by used as a standalone system. Alternatively, the link can be used in an optical dispersion compensation system, or can be incorporated in repeaters (transceivers), enabling an extended reach and/or separation between repeaters. Extending reach or separation between repeaters can be accomplished either by using pure electronic processing, with all-optical compensation and/or dispersion-supported transmission (by means of pulse shaping, correlative coding, or taking advantage of inherent or induced laser and/or modular chirp.)

The link of the present invention can also be utilized to increase spectral efficiency and/or capacity of general communication systems, including wireless systems such as free-space optical communications and ultra wide-band ("UWB") RF communication systems). The reduced spectral content enables the implementation of higher bit-rate function in an existing low bit-rate system. For example, incorporation of the fiber optic link 10 would allow a partial replacement of the 2.5 Gb/s channels by 10 Gb/s grid.

The present invention is also useful for increasing the packing density in storage applications including magnetic, optical and others.

Figure 2:
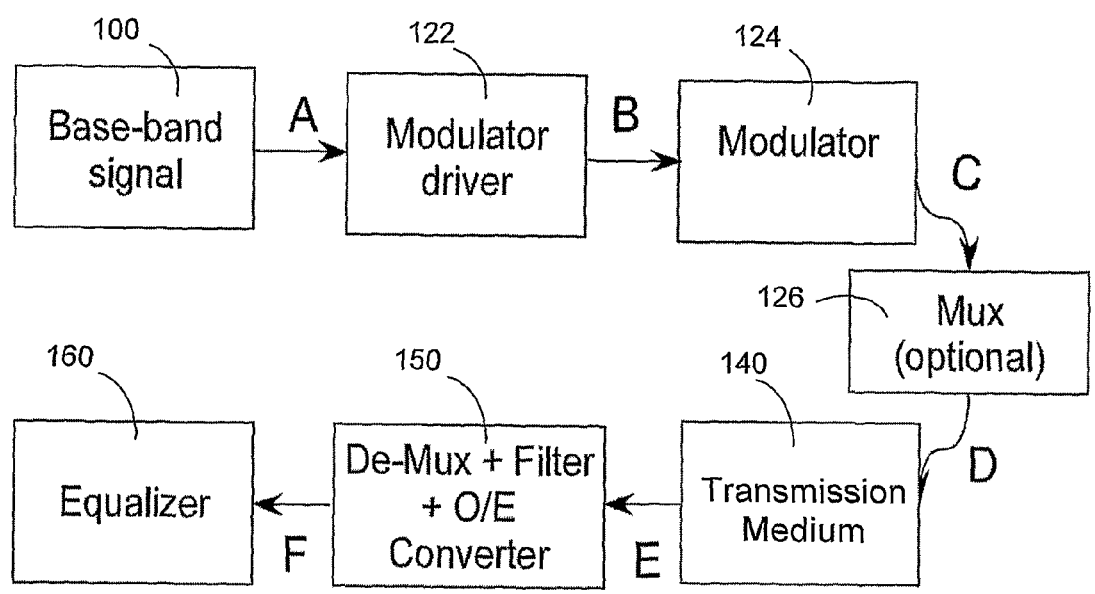
FIG. 2 is a schematic diagram of a generic embodiment of communication media according to the present invention.

FIG. 2 is a schematic diagram of an alternate embodiment of a communication link according to the present invention. As illustrated, the communication link comprises the electrical baseband signal 100 that is ported to the modulator driver 122 and then to the modulator 124. In an optical communication system, the modulator driver 122 and the modulator 124 operate as an optical transmitter, converting the electrical input signal into modulated light for transmission over a transmission medium 140, in this case, fiber optic cable. The resulting modulated signal may be OOK modulated, as in the exemplary embodiment, or may be linearly varied in intensity between two predetermined levels. The light source (not shown) is typically a laser diode. The signal from the modulator 124 may be fed into an optional multiplexer ("MUX") 126 for use in a multi-channel system, and then to transmission medium 140.

The filtering operation can be conducted at any of points A through D, assuming that the baseband signal is represented by the common NRZ waveforms. Point A corresponds to the linear filter 110 of FIG. 1 and lies between the baseband signal source 100 and the modulator driver 122. Point B lies between the modulator driver 122 and modulator 124. At point C between modulator 124 and multiplexer 126, the modulated signal would be filtered, for example, before code division multiplex encoding. At point D, between multiplexer 126 and transmission medium 140, filtering could be performed in the optical domain. In some cases, additional filtering can be performed by the transmission medium itself due to its inherent filtering properties. Further, the first two or three blocks of the diagram can in practice be implemented as a single element, in which case filtering can be packaged within the single element.

The modulated signal is carried over transmission medium 140 to be received at O/E converter 150. As illustrated, the O/E converter 150 may be packaged with a de-multiplexer and filter in a single element. The optical converter 150 converts the received modulated signal into an electrical signal. The output of the converter 150 is directed to the equalizer 160 as discussed above with reference to FIG. 1.

Figure 3:
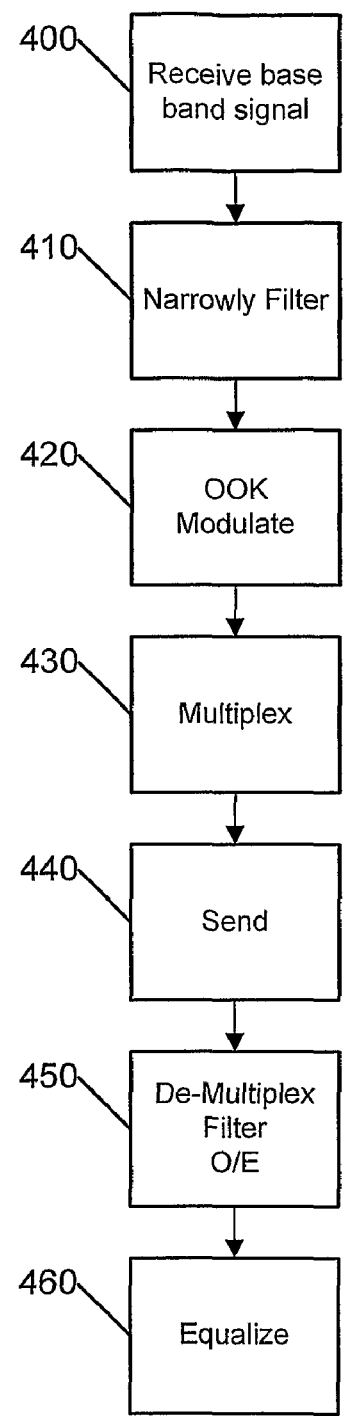
FIG. 3 is a flow chart diagram illustrating an example process for an narrowly filtered on-off keying modulation according to an embodiment of the present invention.

FIG. 3 is a flow chart illustrating an exemplary process for a narrowly filtered OOK modulation according to the present invention. In the illustrated embodiment, the system receives an input signal, transmits it over an optical link and receives the signal at the receiver side.

At a step 400, the system receives a baseband signal, which is typically binary encoded information, i.e., data. At a step 410, the baseband signal is passed to the narrow filter, which excessively filters the baseband signal to a substantially smaller bandwidth signal. For example, the filtering may reach levels below one quarter of the bit rate when the bit rate is expressed in terms of frequency (Hz), rather than the bit-rate units (bits/sec). In the preferred embodiment, the filtering is passive.

The rate of spreading of the information-bearing pulses (ISI) in fiber-optic links depends on the format of the spectral content of the underlying modulation. By restricting the bandwidth, the rate of spreading of the information can be substantially reduced, offering an extended reach for a given equalizer complexity.

As described with reference to FIG. 2, the bandwidth confinement (filtering) can be realized at different stages of the modulation process. In the embodiment illustrated in FIG. 3, the filtering step 410 can be performed before or after modulation step 420, or after multiplexing step 430. In fiber optic links, the most practical filtering is performed electrically by filtering before optical modulation (step 420) as described above. Alternatively, the filtering can be performed in the optical domain using narrowband optical filters. The result of filtering in the optical domain is substantially the same as in the filtering in the electrical domain, however, filtering in the optical domain is both more difficult technologically and more expensive, making it unappealing for practical implementation using current technologies.

In optical links, modulation process can be produced by using directly modulated lasers. In this case, the narrow filtering can be produced by an inherent slow laser response if slower-than-adequate lasers are used for modulation (e.g., in a 10 Gb/s link, using a specked 2.5 Gb/s laser diode instead of a 10 Gb/s laser diode). Alternatively, the narrow filtering can be produced by setting the laser bias current below the recommended value, thus, intentionally introducing a slower laser response to the modulating signal.

At a step 420, the narrowly filtered signal is modulated using a simple on-off key (OOK) modulation technique.

Regardless of the selected modulation method, the goal is to restrict the bandwidth of the signal that is transmitted through the transmission medium to a substantially smaller bandwidth than the original baseband signal, based on NRZ signaling at a given information rate.

At step 430, the signal is multiplexed for multi-channel operation. Multiplexing in communications systems is well known in the art. At step 440, the signal is sent via the transmission medium, e.g., optical fiber or free-space.

At step 450, the signal is detected and de-multiplexed. O/E converter converts the optical signal to an electrical signal.

At step 460, the signal is equalized. The performance penalties introduced by the spectral confinement (filtering) are substantial. Reliable detection and retrieval of data following such severe band limitation is possible only by employing equalization utilizing electronic methods. Any of the previously described equalization techniques may be employed here.

Figure 4:
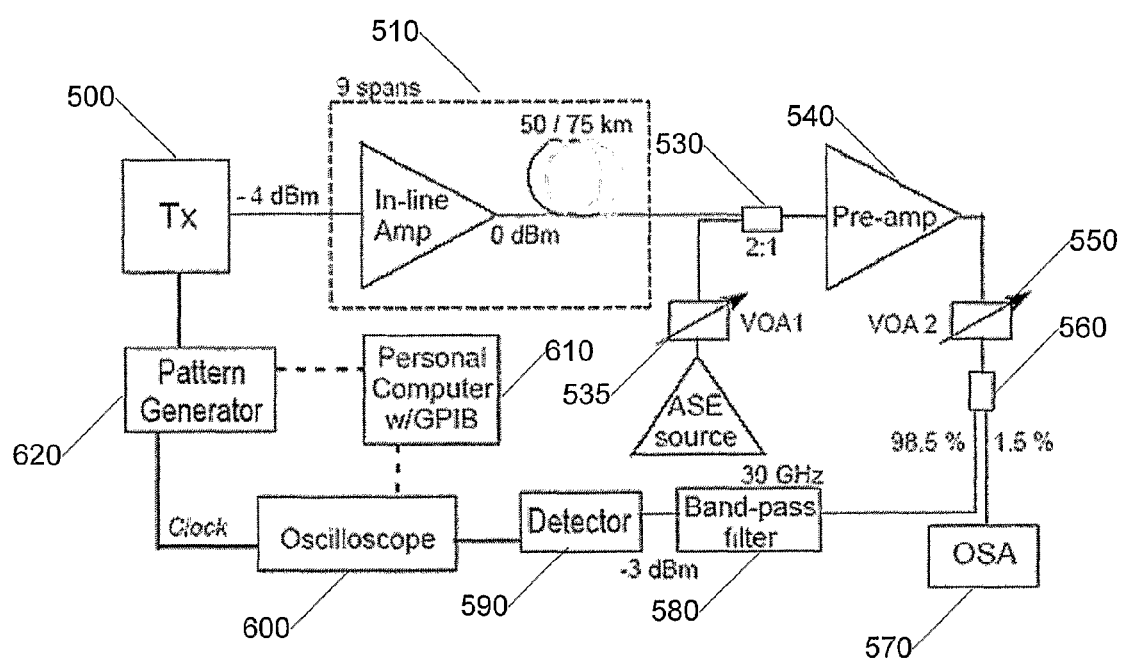
FIG. 4 is a schematic diagram of an experimental setup block diagram for testing extended dispersion-limited reach with a narrowly filtered on-off keying modulation and no optical dispersion compensation according to an embodiment of the present invention.

FIG. 4 is a schematic diagram of an experimental setup for testing an extended dispersion-limited reach with a narrowly filtered OOK modulation with no optical dispersion compensation according to the present invention. The illustrated set up demonstrates a testing environment for evaluating the affect of spectral channel narrowing on 10 Gb/s NRZ extended dispersion-limited reach of over 600 km. Equalization at the receiver was based on a reduced complexity Viterbi algorithm.

With the application of EDC, the dispersion-limited reach is no longer directly related to the eye opening penalty, because detection is not performed on a bit-by-bit basis. More important to determining the practically attainable reach is the complexity of the underlying algorithm, which dictates the complexity of the integrated circuit. Regardless of the equalization technique used, the complexity is related to the span of intersymbol interference ("ISI").

The narrowly filtered OOK modulation method of the present invention allows the extension of the reach of conventional equalized links. As previously described, ISI is intentionally introduced at the transmitter, which reduces the subsequent span-contributed ISI yielding a longer reach for the equalized link. The experiments performed using the experimental setup illustrated in FIG. 4 validated OC-192 (10 Gb/s) transmission over a 600 km single mode fiber link. The experimental results are in complete agreement with theoretical results.

For the test, a zero chirp modulator 500 was used to produce an OC-192 data stream. In-line optical amplification 510 was performed after each of the nine conventional single mode fiber ("SME") spans with average dispersion per unit length of 17 ps/km-nm. The channel launch power into each span was maintained at 0 dBm using variable optical attenuators (not shown). Preceding the pre-amplifier stage 540, a 2:1 multiplexer 530 combined the output from the 600 km span with an ASE source whose power was monitored and controlled by variable optical attenuator ("VOA 1") 535 for flexible adjustment of the OSNR (optical signal to noise ratio) at the receiver. A pre-amplified 540 PIN receiver was used for a signal detection. Variable optical attenuator ("VOA 2") 550 was used to guarantee constant received power of −3 dBm throughout the experiment, resulting in variable OSNR that was monitored on an optical spectrum analyzer ("OSA") 570 in real time after being directed to the OSA by a device 560.

Subsequently, the signal was passed to a band-pass filter 580 then to detector 590 and displayed on an oscilloscope 600 and/or on a personal computer 610 equipped with a general purpose interface bus (GPIB).

Training and data sequences were loaded into a 10 Gb/s pattern generator 620 serving as the primary data source. Traces from the fast sampling oscilloscope 600, triggered by the data pattern, were acquired and returned to the computer 610 to perform data processing. The architecture fully emulated a dedicated receiver structure, as well as the Bit Error Rate ("BER") evaluation sub-mode. A short ($2^{11}$-1 long) pseudorandom bit sequence ("PRBS") was used for training, whereas BER measurements were performed using a long PRBS sequence that was run until at least 100 errors were detected. Processing and training were performed in blocks of 230 bits, where the appropriate PRBS sequences in both stages of the experiment were divided into partially overlapping 230-bit parts allowing for performance degradation due to patterning effects. BER measurements were performed until the level $10^{-3}$ was reached, ensuring operation below the practical seven percent overhead FEC threshold of $2 \times 10^{-3}$.

The experimental setup including the sampling oscilloscope 600 allowed BER measurement for several receiver structures preceding the Viterbi algorithm (VA): 1) an ideal integrate-and-dump; 2) a non-ideal integrator with a shape approximated by a 0.6 roll-off raised cosine; 3)1-sample per bit (spb); and 4) 2 spb. A 64-state VA was used throughout the experiment, whereas the quantization depth was varied from 4 to 7 bits to investigate the impact of A/D conversion on the performance.

The present 64-state VA with 4-bit A/D fully practical architecture is capable of driving BER well below the FEC threshold for all receiver structures under the consideration. More importantly, the low-pass filtered shape of the waveforms allows for negligible difference in performance between 1-spb and 2-spb receiver structures.

Figure 5:
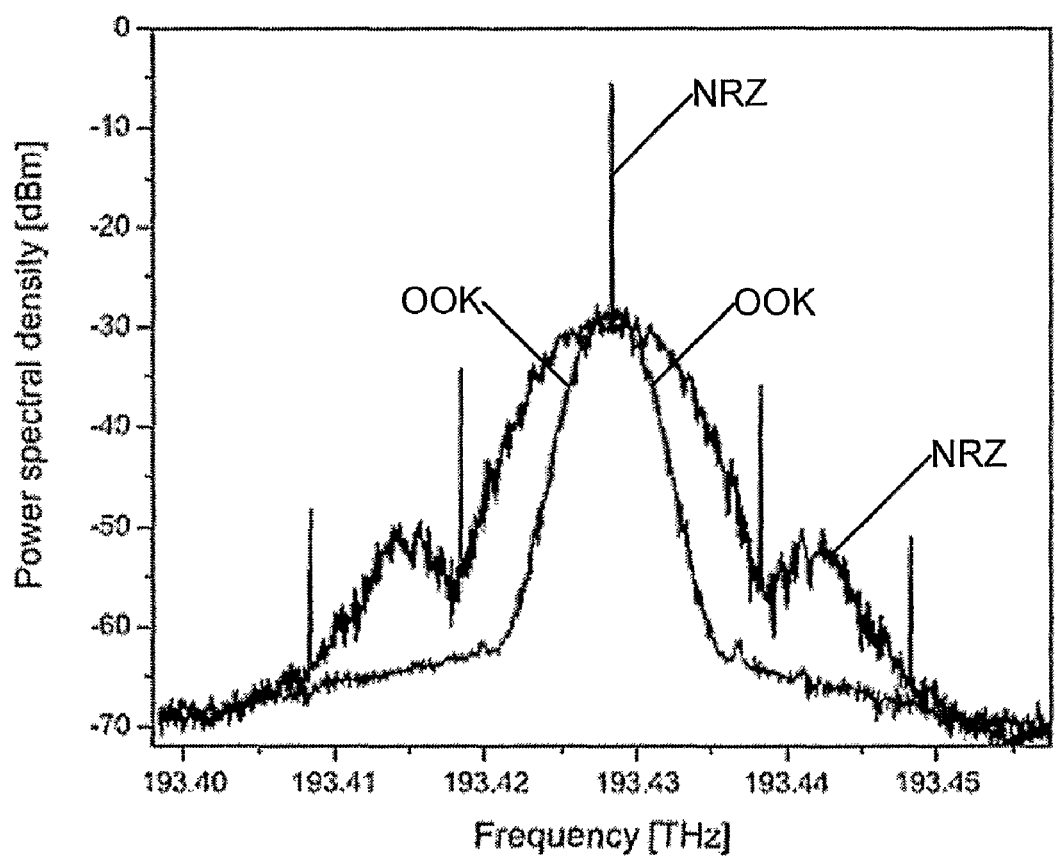
FIG. 5 is a plot of spectral density versus frequency comparing a signal processed by narrowly filtered OOK modulation according to the present invention and the conventional NRZ spectra.

FIG. 5 is a plot of spectral density in dBm versus frequency in THz comparing a signal processed by narrowly filtered OOK modulation (labeled "OOK") according to the present invention and the conventional NRZ spectra (labeled "NRZ"). The plot shows the results of the experimental demonstration of 10 Gb/s NRZ extended dispersion-limited reach.

In order to exceed the dispersion limited reach of 500 km, standard NRZ was filtered to approximately 3.8 GHz FWHM bandwidth. FIG. 5 shows both the launched narrowly filtered "OOK" and standard NRZ spectrum measured using a 10-MHz resolution OSA. A conventional (unprocessed) bit-by-bit detection BER yields 0.17 for this heavily distorted launch state. The response of narrowly filtered waveforms does not change appreciably during the first 120 km, whereas the ISI-span gradually increases in subsequent spans, in approximate steps of 120 km. This slower rate of information-bearing pulse spreading is primarily responsible for the extended reach of NF-OOK and is a fundamental advantage used in this reduced-complexity detection scheme.

Figure 6:
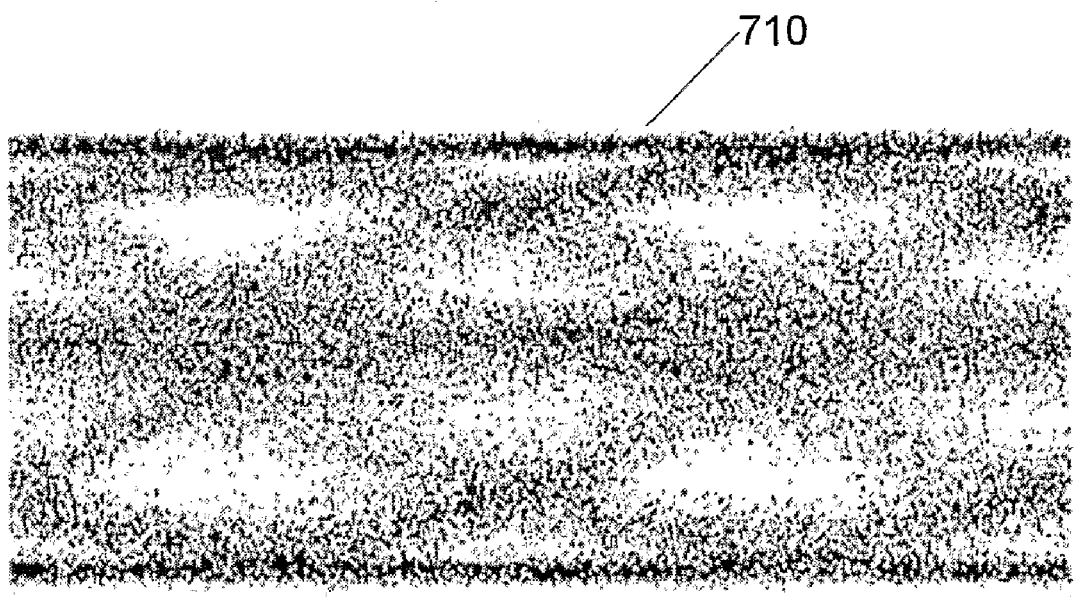
FIG. 6 is an "eye-diagram" of spectral density of signal processed by narrowly filtered OOK modulation according to the present invention.

FIG. 6 is an "eye-diagram" 710 of the spectral density of a signal processed by narrowly filtered OOK modulation according to the present invention. The ISI-span of NF-OOK at back-to-back was measured and simulated at 3 bit slots, with completely closed eye.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Accordingly, the scope of the present invention is limited by nothing other than the appended claims.

REFERENCES

Incorporated Herein by Reference

1. Yonenaga, S. Kuwano, "Dispersion-Tolerant Optical Transmission System Using Duobinary Transmitter and Binary Receiver", *J. Lightwave Tech.*, Vol. 15, No. 8, pp. 1530-1537, August 1997.
2. R. A. Griffin and A. C. Carter, "Optical differential quadrature phaseshift keying (oDQPSK) for high capacity optical transmission," in *Proc. OFC*, Anaheim, Calif., 2002, Paper WX6C.

3. F. Buchali and H. Bulow, "Correlation sensitive Viterbi equalization of 10 Gb/s signals in bandwidth limited receivers," in *Proc. OFC* 2005, Paper F020
4. J.-P. Elbers, H. Wernz, H. Griesser, C. Glingener et al. "Measurement of the Dispersion Tolerance of Optical Duobinary with an MLSE-Receiver at 10.7 Gb/s," in *Proc. OFC* 2005, Paper OThJ4
5. M. Sieben, J. Conradi, and D. Dodds, "Optical Single Sideband Transmission at 10 Gb/s Using Only Electrical Dispersion Compensation", *J. Lightwave Tech.* LT17 (1999), pp. 1742-1749.
6. N. Alic, et al., "Experimental Demonstration of 10 GB/s NRZ Extended Dispersion-Limited REach over 600 km-SMF Link without Optical Dispersion Compensation", *Proceedings—2006 OFC/NFOEC*, Anaheim, Calif., Mar. 5-9, 2006.

What is claimed is:

1. A method for extending dispersion-limited reach and/or spectral efficiency of a signal in a communications link, comprising:
   intentionally inducing severe intersymbol interference in a baseband signal by narrowly filtering an input baseband signal having a first bandwidth to produce a single, filtered baseband signal having a second reduced bandwidth that is less than one-quarter of the first bandwidth, wherein the severe intersymbol interference is manifested as a closed eye;
   before or after filtering, modulating the input baseband signal;
   transmitting the filtered and modulated baseband signal across a transmission medium;
   receiving the transmitted signal at a receiver in communication with the transmission medium;
   converting the received signal into an electrical signal; and
   applying electronic dispersion compensation to the electrical signal to detect a sequence of symbols within the signal.

2. The method of claim 1, wherein modulating comprises applying on-off key modulation.

3. The method of claim 1, wherein the transmission medium is an optical fiber.

4. The method of claim 1, wherein the transmission medium is free space.

5. The method of claim 1, wherein narrowly filtering comprises applying a passive linear filter.

6. The method of claim 1, wherein applying electronic dispersion compensation comprises using a Maximum Likelihood Sequence Estimate equalizer.

7. The method of claim 1, wherein the modulator applies on-off key modulation.

8. The method of claim 1, wherein modulating comprises applying modulation selected from the group consisting QPSK, M-ary PSK, and Optical oQPSK.

9. The method of claim 1, wherein applying electronic dispersion compensation comprises applying an algorithm selected from the group consisting of a Viterbi algorithm, a BCJR algorithm, a SISO algorithm, a MAP algorithm, a sliding window MAP algorithm, and a Soft Output Viterbi Algorithm (SOVA)).

10. A method for increasing spectral efficiency and/or extending dispersion limited reach of an input signal in a communications link, comprising:
   intentionally inducing severe intersymbol interference by reducing a bandwidth of the input signal by excessively filtering an electrical baseband signal having a first bandwidth with a single filter to produce a filtered baseband signal having a second bandwidth less than one-quarter of the first bandwidth so that spectral content of the input signal is reduced, wherein the severe intersymbol interference is manifested as a closed eye;
   before or after reducing the bandwidth, modulating the filtered baseband signal;
   transmitting the reduced bandwidth modulated baseband signal across the communications link;
   receiving the transmitted signal at a receiver;
   converting the received signal into an electrical signal; and
   applying electronic dispersion compensation to the electrical signal to detect sequences of symbols to retrieve data within the received signal.

11. The method of claim 10, wherein modulating comprises applying on-off key modulation.

12. The method of claim 10, wherein the communications link is an optical fiber.

13. The method of claim 10, wherein the filter comprises a passive linear filter.

14. The method of claim 10, wherein reducing the bandwidth comprises selecting a laser source for modulation wherein the laser source has much smaller response rate compared to a channel capacity of the communications link.

15. The method of claim 10, wherein modulating comprises applying modulation selected from the group consisting QPSK, M-ary PSK, and Optical oQPSK.

16. The method of claim 10, wherein applying electronic dispersion compensation comprises applying an algorithm selected from the group consisting of a Maximum Likelihood Sequence Estimator, a Viterbi algorithm, a BCJR algorithm, a SISO algorithm, a MAP algorithm, a sliding window MAP algorithm, and a Soft Output Viterbi Algorithm (SOVA)).

17. A system having increased spectral efficiency and/or dispersion limited reach of a signal in a communications link, comprising:
   a narrow filtering module adapted for receiving an input baseband signal having a first bandwidth and intentionally inducing severe intersymbol interference to produce a closed eye by excessively filtering the input baseband signal to produce a signal having reduced spectral content with a second bandwidth that is less than one-quarter of the first bandwidth;
   a modulator disposed before or after the narrow filtering module for modulating the baseband signal for transmission;
   a transmission medium for transmitting the modulated baseband signal having reduced spectral content over a distance;
   a receiver in communication with the transmission medium for receiving the modulated baseband signal and converting the received signal into an electrical signal, and
   an electronic dispersion compensator adapted to detect a sequence of symbols for retrieving information content of the electrical signal.

18. The system of claim 17, wherein the transmission medium is an optical fiber.

19. The system of claim 18, wherein the narrow filtering module comprises a laser source having a much smaller response rate compared to a channel capacity of the transmission medium.

20. The system of claim 17, wherein the narrow filtering module comprises a passive linear filter.

21. The system of claim 17, wherein modulator applies modulation selected from the group consisting QPSK, M-ary PSK, and Optical oQPSK.

22. The system of claim 17, wherein the electronic dispersion compensator applies an algorithm selected from the group consisting of a Maximum Likelihood Sequence Estimator, a Viterbi algorithm, a BCJR algorithm, a SISO algorithm, a MAP algorithm, a sliding window MAP algorithm, and a Soft Output Viterbi Algorithm (SOVA)).

23. In a communications link, a system for increasing spectral efficiency and/or dispersion-limited reach of a signal transmitted across a transmission medium, wherein the signal comprises encoded data, the system comprising:

a transmitter at an input end of the transmission medium, the transmitter comprising a combination of a modulator and a narrowing filter module adapted to receive and intentionally induce severe intersymbol interference by excessively filtering an input baseband signal having an input bandwidth to reduce spectral content of the baseband signal for transmission at a reduced bandwidth that is less than one-quarter of the input bandwidth, wherein the severe intersymbol interference is manifested as a close eye; and a receiver at an output end of the transmission medium, the receiver comprising a combination of a detector, a converter and an equalizer for detecting the transmitted signal, converting the received signal into an electrical signal and equalizing the electrical signal by performing electrical dispersion compensation by detecting a sequence of symbols to extract the encoded data from the signal.

24. The system of claim 23, wherein the equalizer applies an algorithm selected from the group consisting of a Maximum Likelihood Sequence Estimator, a Viterbi algorithm, a BCJR algorithm, a SISO algorithm, a MAP algorithm, a sliding window MAP algorithm, and a Soft Output Viterbi Algorithm (SOVA)).

25. The system of claim 23, wherein the transmission medium is an optical fiber.

26. The method of claim 23, wherein the transmission medium is free space.

27. The method of claim 23, wherein modulator applies modulation selected from the group consisting on-off key modulation, QPSK, M-ary PSK, and Optical oQPSK.

* * * * *